United States Patent
Sodani et al.

(10) Patent No.: US 11,687,837 B2
(45) Date of Patent: *Jun. 27, 2023

(54) ARCHITECTURE TO SUPPORT SYNCHRONIZATION BETWEEN CORE AND INFERENCE ENGINE FOR MACHINE LEARNING

(71) Applicant: Marvell Asia Pte Ltd, Singapore (SG)

(72) Inventors: Avinash Sodani, San Jose, CA (US); Gopal Nalamalapu, Santa Clara, CA (US)

(73) Assignee: Marvell Asia Pte Ltd, Singapore (SG)

(*) Notice: Subject to any disclaimer, the term of this patent is extended or adjusted under 35 U.S.C. 154(b) by 0 days.

This patent is subject to a terminal disclaimer.

(21) Appl. No.: 17/849,991

(22) Filed: Jun. 27, 2022

(65) Prior Publication Data

US 2022/0374774 A1   Nov. 24, 2022

Related U.S. Application Data

(63) Continuation of application No. 17/247,102, filed on Nov. 30, 2020, now Pat. No. 11,403,561, which is a
(Continued)

(51) Int. Cl.
*G06N 20/00* (2019.01)
*G06F 9/38* (2018.01)
(Continued)

(52) U.S. Cl.
CPC .......... *G06N 20/00* (2019.01); *G06F 9/3836* (2013.01); *G06F 9/52* (2013.01); *G06F 12/0804* (2013.01);
(Continued)

(58) Field of Classification Search
None
See application file for complete search history.

(56) References Cited

U.S. PATENT DOCUMENTS

| 4,982,291 A | 1/1991 | Kurahashi et al. |
| 6,415,377 B1 | 7/2002 | Wolf et al. |

(Continued)

FOREIGN PATENT DOCUMENTS

WO   2018222904 A1   12/2018

OTHER PUBLICATIONS

Brewer, "Instructions Set Innovations for the Convey HC-1 Computer", 2010, pp. 70-79, Year: 2010.
(Continued)

*Primary Examiner* — Eric Coleman

(57) ABSTRACT

A system to support a machine learning (ML) operation comprises a core configured to receive and interpret commands into a set of instructions for the ML operation and a memory unit configured to maintain data for the ML operation. The system further comprises an inference engine having a plurality of processing tiles, each comprising an on-chip memory (OCM) configured to maintain data for local access by components in the processing tile and one or more processing units configured to perform tasks of the ML operation on the data in the OCM. The system also comprises an instruction streaming engine configured to distribute the instructions to the processing tiles to control their operations and to synchronize data communication between the core and the inference engine so that data transmitted between them correctly reaches the corresponding processing tiles while ensuring coherence of data shared and distributed among the core and the OCMs.

30 Claims, 3 Drawing Sheets

Related U.S. Application Data continuation of application No. 16/420,092, filed on May 22, 2019, now Pat. No. 10,929,779, which is a continuation-in-part of application No. 16/226,539, filed on Dec. 19, 2018, now Pat. No. 10,824,433.

(60) Provisional application No. 62/675,076, filed on May 22, 2018.

(51) Int. Cl.
*G06F 12/0804* (2016.01)
*G06F 9/52* (2006.01)
*G06F 15/78* (2006.01)
*G06F 9/50* (2006.01)
*G06F 15/80* (2006.01)
*G06F 9/30* (2018.01)
*G06N 5/04* (2023.01)

(52) U.S. Cl.
CPC ........ *G06F 9/3001* (2013.01); *G06F 9/30018* (2013.01); *G06F 9/5083* (2013.01); *G06F 15/7842* (2013.01); *G06F 15/7846* (2013.01); *G06F 15/8015* (2013.01); *G06F 2212/1032* (2013.01); *G06N 5/04* (2013.01)

(56) References Cited

U.S. PATENT DOCUMENTS

| | | | |
|---|---|---|---|
| 6,640,262 B1 | 10/2003 | Uppunda et al. | |
| 7,509,363 B2 | 3/2009 | Clifton | |
| 7,840,914 B1 * | 11/2010 | Agarwal | G06F 8/451 |
| | | | 716/102 |
| 7,912,883 B2 | 3/2011 | Hussain | |
| 8,200,728 B2 | 6/2012 | Michaels et al. | |
| 8,209,703 B2 | 6/2012 | Yee et al. | |
| 9,954,771 B1 | 4/2018 | Levy et al. | |
| 10,296,556 B2 | 5/2019 | Zhou | |
| 10,305,766 B1 | 5/2019 | Zhang et al. | |
| 11,604,799 B1 | 3/2023 | Bigdelu et al. | |
| 2004/0153501 A1 | 8/2004 | Yamashita et al. | |
| 2007/0122347 A1 | 5/2007 | Statnikov et al. | |
| 2009/0158005 A1 | 6/2009 | Carmichael | |
| 2013/0101035 A1 * | 4/2013 | Wang | H04N 19/174 |
| | | | 375/E7.243 |
| 2013/0117521 A1 * | 5/2013 | Li | G06F 12/1045 |
| | | | 711/170 |
| 2014/0007098 A1 | 1/2014 | Stillwell, Jr. et al. | |
| 2015/0106568 A1 | 4/2015 | Feldman et al. | |
| 2015/0309808 A1 * | 10/2015 | Nandy | G06F 9/44505 |
| | | | 713/100 |
| 2015/0347012 A1 | 12/2015 | Dewitt et al. | |
| 2016/0132272 A1 | 5/2016 | Iwashita | |
| 2017/0068571 A1 | 3/2017 | Lu et al. | |
| 2017/0083313 A1 * | 3/2017 | Sankaralingam | G06F 15/825 |
| 2017/0353397 A1 | 12/2017 | Che | |
| 2017/0364694 A1 | 12/2017 | Jacob et al. | |
| 2018/0341484 A1 * | 11/2018 | Fowers | G06F 9/30036 |
| 2019/0121641 A1 * | 4/2019 | Knowles | G06F 9/3009 |
| 2019/0121679 A1 * | 4/2019 | Wilkinson | G06F 9/3009 |
| 2019/0147471 A1 | 5/2019 | McKelvey, Jr. et al. | |
| 2021/0216874 A1 | 7/2021 | Jegou et al. | |
| 2023/0024035 A1 | 1/2023 | Thuerck et al. | |
| 2023/0071931 A1 | 3/2023 | Huang et al. | |

OTHER PUBLICATIONS

Seng, et al. "Reducing Power with Dynamic Critical Path Information", Jan. 1999, pp. 114-123; Year: 1999.

* cited by examiner

ARCHITECTURE TO SUPPORT SYNCHRONIZATION BETWEEN CORE AND INFERENCE ENGINE FOR MACHINE LEARNING

CROSS-REFERENCE TO RELATED APPLICATIONS

This application is a continuation of U.S. patent application Ser. No. 17/247,102, filed Nov. 30, 2020, which is a continuation of U.S. patent application Ser. No. 16/420,092, filed May 22, 2019, which is a continuation-in-part of U.S. patent application Ser. No. 16/226,539, filed Dec. 19, 2018, now U.S. Pat. No. 10,824,433, issued Nov. 3, 2020, and claims the benefit of U.S. Provisional Application No. 62/675,076, filed May 22, 2018, which are incorporated herein in their entirety by reference.

BACKGROUND

Applied Machine Learning (ML) is a booming field that utilizes a cascade of layers of nonlinear processing units and algorithms for feature extraction and transformation with a wide variety of usages and applications. ML typically involves two phases, training, which uses a rich set of training data to train a plurality of machine learning models, and inference, which applies the trained machine learning models to actual applications. Each of the two phases poses a distinct set of requirements for its underlying infrastructures. Various infrastructures may be used, e.g., graphics processing unit (GPU), a central processing unit (CPU), a Field Programmable Gate Array (FPGA), an Application Specific Integrated Circuit (ASIC), etc. Specifically, the training phase focuses on, as a non-limiting example, GPU or ASIC infrastructures that scale with the trained models and retraining frequency, wherein the key objective of the training phase is to achieve high performance and reduce training time. The inference phase, on the other hand, focuses on infrastructures that scale with the applications, user, and data, and the key objective of the inference phase is to achieve energy (e.g., performance per watt) and capital (e.g., return on investment) efficiency.

Inference phase of ML is usually very computationally and data intensive. Unfortunately, as the input data and model sizes grow, data movement becomes a bottleneck and data processing increases because in order to perform simple processing, three operations or instructions are performed for each data, e.g., load, processing, and store. As the amount of data grows, performing these three operations or instructions becomes burdensome. Moreover, the current computing architecture is not scalable and are not well suited for ML and its applications, since a lot of time goes in loading and storing the data in comparison to processing the data.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
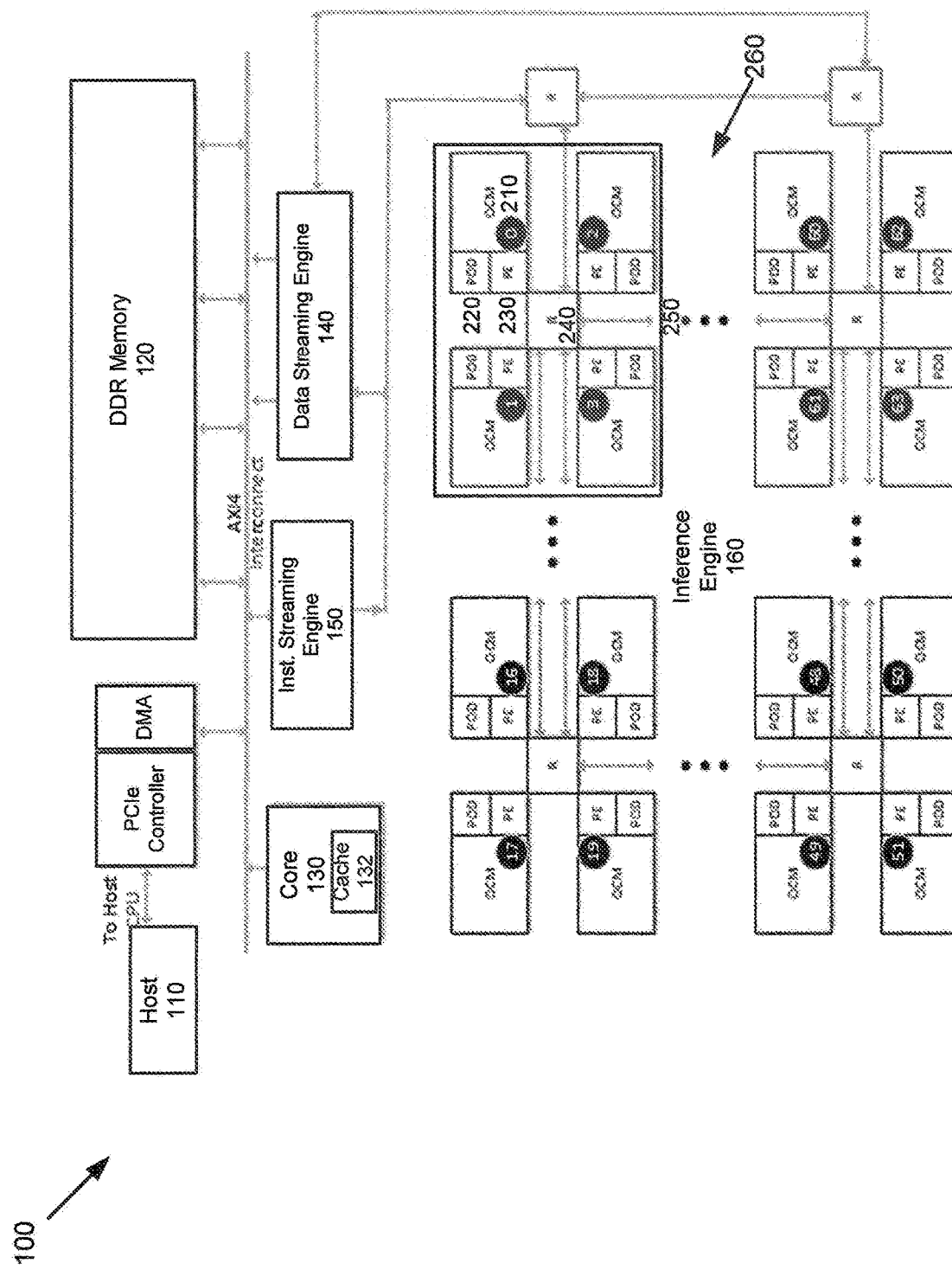
FIG. 1 depicts an example of diagram of a hardware-based programmable architecture configured to support inference acceleration for machine learning according to one aspect of the present embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

FIG. 1 depicts an example of a diagram of a hardware-based programmable system/architecture 100 configured to support inference acceleration for machine learning. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

Each of the engines in the architecture 100 is a dedicated hardware block/component including one or more microprocessors and on-chip memory units storing software instructions programmed by a user for various machine learning operations. When the software instructions are executed by the microprocessors, each of the hardware components becomes a special purposed hardware component for practicing certain machine learning functions as discussed in detail below. In some embodiments, the architecture 100 is on a single chip, e.g., a system-on-chip (SOC).

In the example of FIG. 1, the architecture 100 may include a host 110 coupled to a memory (e.g., DDR) 120 and a core engine 130 via a PCIe controller and/or a direct memory access (DMA) module. The host 110 is a processing unit configured to receive or generate data to be analyzed and/or inferred by architecture 100 via machine learning. The DDR memory 120 is coupled to a data streaming engine 140 configured to transfer/stream data between the DDR memory 120 and on-chip memory (OCM) 210 of an inference engine 160 discussed below via DDR-to-OCM DMA or DoD. The core 130 is a processing engine configured to receive and interpret a plurality of ML commands from the host 110 into instructions for a ML operation. The core 130 is also configured to process a plurality of performance non-critical operations, e.g., data/instruction preparatory work, data collection, data mapping, etc. The core 130 is coupled to an instruction-streaming engine 150, which accepts instructions destined for the inference engine 160 from the core 130 and distributes the instructions to the appropriate units within the inference engine 160. The inference engine 160 is configured to perform dense and sparse operations on received stream of data, e.g., to identify a subject in an image, by using the training data and executing the programming instructions received from the instruction-streaming engine 150.

In some embodiments, the inference engine 160 includes a two-dimensional computing array of processing tiles, e.g., tiles 0, . . . , 63, arranged in, e.g., 8 rows by 8 columns. Each processing tile (e.g., tile 0) includes at least one on-chip memory (OCM) e.g., 210, one POD engine (or POD), e.g., 220, and one processing engine/element (PE), e.g., 230. Here, the OCMs in the processing tiles are configured to receive data from the data streaming engine 140 in a streaming fashion. The OCMs enable efficient local access to data per processing tile. The PODs are configured to perform dense or regular computations on the received data in the OCMs, e.g., matrix operations such as multiplication, matrix manipulation, tanh, sigmoid, etc., and the PEs are configured to perform sparse/irregular computations and/or complex data shape transformations of the received data in the OCMs, e.g., memory transpose, addition operation, operations on irregular data structures (such as trees, graphs, and priority queues), respectively. Both the PODs and the PEs can be programmed according to the programming instructions received from the instruction-streaming engine 150. Accordingly, the data is received and processed by each processing tile as an input data stream from the DDR memory 120 and the result is output by each processing tile as a stream of data to the DDR memory 120.

In some embodiments, a plurality of (e.g., four) processing tiles in the inference engine 160 together form a processing block or quad 250, e.g., processing tiles 0-3 form processing block 250, wherein the processing tiles within each processing block 250 are coupled to one another via a routing element 240. In some embodiments, all the routing elements are connected together as a mesh 260 of interconnect to connect the processing blocks in the same row or column as a two-dimensional array. It is appreciated that the number and/or types of components within each processing tile, the formation of the processing blocks, the number of processing tiles in each processing block, and the number of processing blocks in each row and column of the inference engine 160 as shown in FIG. 1 are exemplary and should not be construed as limiting the scope of the embodiments. In some embodiments, the same number of PE and POD may be used for each tile, and the same number of blocks may be used in each row and column in order to provide flexibility and scalability.

Figure 2:
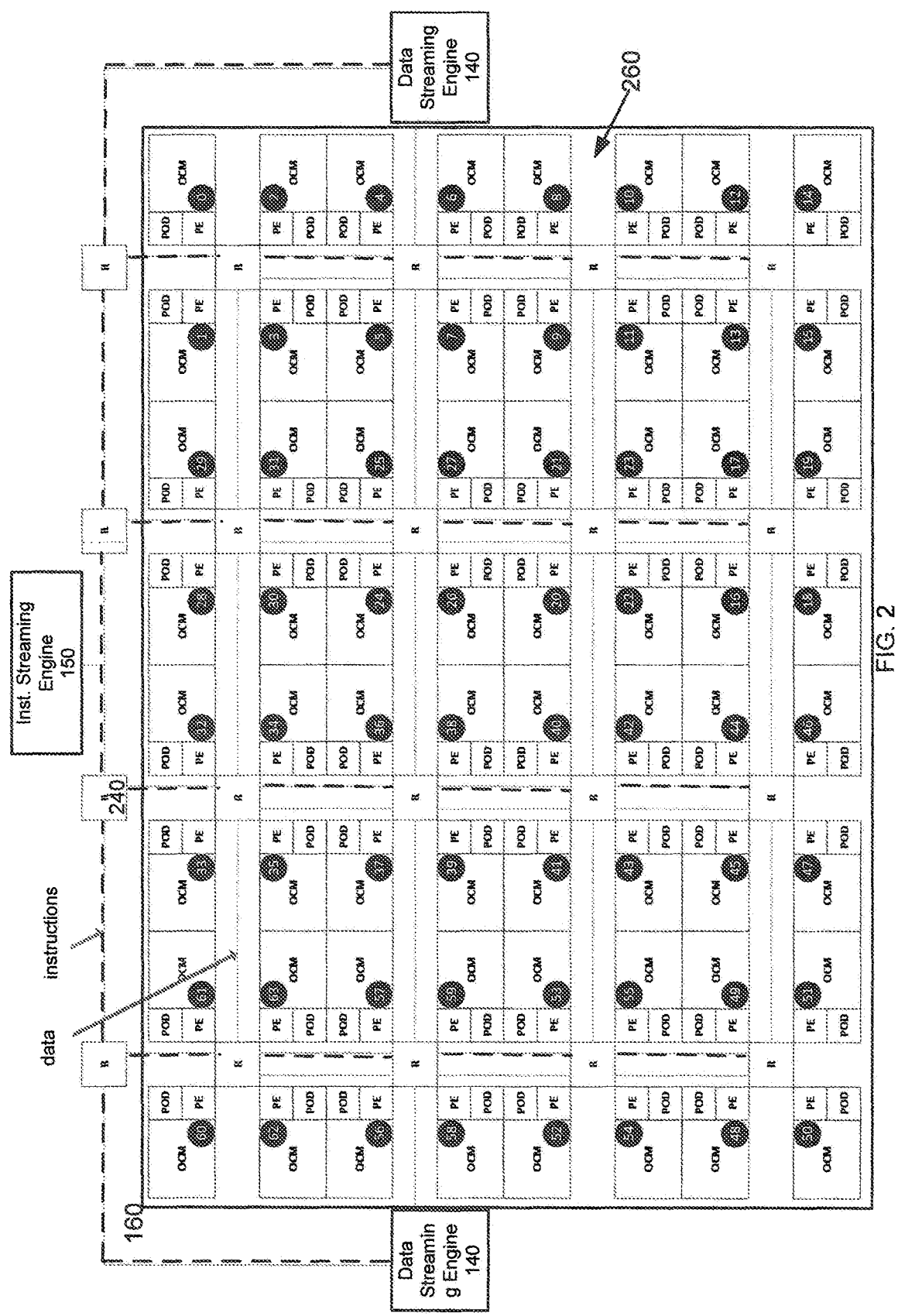
FIG. 2 depicts an example illustrating delivery of data and instructions from the data streaming engine and the instruction streaming engine to the inference engine, respectively, according to one aspect of the present embodiments.

FIG. 2 depicts an example illustrating delivery of data (represented by solid line) and instructions (represented by dotted lines) from the data streaming engine 140 and the instruction streaming engine 150 to the inference engine 160, respectively. In some embodiments, the instructions are sent from the instruction streaming engine 150 with a tile mask, indicating which processing tiles the instructions should be delivered to. Each router 240 is configured to check the tile mask to determine whether each instruction should be sent to one or more connected processing tiles or to a downstream router so that the instructions are always delivered to all the intended processing tiles in the right order. In some embodiments, each router 240 is also configured to check if there is enough buffer space in the processing tiles and/or the downstream router. Each router can start sending the next instructions only after the current instruction is sent to all intended processing tiles connected to the router and/or its downstream router.

In some embodiments, the instruction streaming engine 150 is configured to utilize a set of synchronization instructions to synchronize a set of task instructions to be executed by the POD 220 or PE 230 of each processing tile, respectively, to wait certain tasks/operations to finish at each processing tile before starting a new one to avoid race conditions. For a non-limiting example, any instruction following a synchronization instruction PE_sync or POD_sync will wait in the instruction control queue in the POD 220 or PE 230, respectively, until all the prior instructions in the queue have been completed. For another non-limiting example, instruction INS_Sync will hold the task in the instruction streaming engine 150 until the prior tasks are done.

In some embodiments, the instruction streaming engine 150 is configured to add two or more bits to each task instruction to indicate whether the task performed by the task instruction is executed needs to be synchronized or not. Such synchronization indications/types include but are not limited to no-sync, local-sync, global-sync, and instruction-sync or inst-sync. Specifically, no-synchronization or no-sync indicates that the task does not have any dependency on the prior tasks; local-synchronization or local-sync indicates that the task depends "locally" on the prior task, e.g., the task depends on local POD 220 or PE 230 in the processing block to complete the prior task; global-synchronization or global-sync indicates that the task depends on prior task to complete globally among different processing tiles; and inst-sync indicates that the task instruction needs to be held back in the instruction streaming engine 150 until all prior tasks in the mesh 260 of the inference engine 160 are done.

In some embodiments, the instruction streaming engine 150 is configured to assign every task with a color, e.g., red or blue, to represent its current state/status based on the synchronization indication. Note that although color is used to illustrate the proposed approach in the following discussions, any flag or indication of binary or multiple values can be used in place of color in a similar fashion. If a task is marked either as global-sync or inst-sync, then the color assigned to the task will be opposite of the color assigned to the prior task, e.g., red as opposed to blue or blue as opposed to red. If a task is marked either as local-sync or no-sync, then color of the task does not change from the prior task. In some embodiments, the instruction streaming engine 150 maintains a queue to track color transitions of the tasks, where the color transition queue stores the synchronization indications for the color transitions and the color of each task and/or processing tile after each color transition. The color of the processing tiles that are not participating in the synchronization remain unchanged. When a task with global or inst-sync is received, the instruction streaming engine 150 is configured to assigns the next available entry in color transition queue for the synchronization. The task is stalled in the instruction streaming engine 150 if the color transition queue is full.

In some embodiments, the instruction streaming engine 150 is configured to pick one of the processing tiles among the set of processing tiles that are involved in the synchronization to be the designated tile, which is to inform to the instruction streaming engine 150 when the synchronization is done via a dedicated set of wires of a color bus on the mesh 260 as discussed below. Each entry/signal on each of the wires signifies the color of each processing tile after each color transition. On the receiving end, the instruction streaming engine 150 receives a message from the designated processing tile when the synchronization between the processing tiles is complete including an index to the color transition queue. The instruction streaming engine 150 then uses the index to access the color transition queue and mark the corresponding entry in the color transition queue free, which completes the synchronization. At this point, the color transition is said to have completed and any action waiting for this color transition can be taken.

When the instruction streaming engine 150 receives an inst-sync instruction or a task with sync-bits set to inst-sync, the instruction streaming engine 150 is configured to take steps to make sure that all tasks in the mesh 260 of the inference engine 160 are done before next task is issued from the instruction streaming engine 150. Specifically, the instruction streaming engine 150 stops issuing new tasks, changes color for all processing tiles, and inserts a new set of colors in the color transition queue. The instruction streaming engine 150 then sends an inst-sync message to all processing tiles with the new color. If the new color is different for the color of a subset of the processing tiles, two inst-sync messages are sent—one for the processing tiles of one/first color and another for the processing tiles of another/second color. The inst-sync message sent to each processing tile is inserted in the task queue of the processing tile. When the instsync message is at the head of the task queue, the processing tile drives the color of the inst-sync message onto the color bus discussed below, indicating to all other processing tiles that this processing tile is ready to switch color. The processing tile waits until all the bits on the color bus matching the tile mask have moved to the same color before switching the color of the processing tile internally to a new color and deallocate the instsync message from the task queue. The designated tile then sends the synchronization done message to the instruction streaming engine 150 and the inst-sync is done once the instruction streaming engine 150 receives this message. In the case where the new color is different for a subset of the processing tiles, the instruction streaming engine 150 is configured to issue an instruction to all processing tiles to reset their color to the new color after the inst-sync is done to align all processing tiles back to the same color. The instruction streaming engine 150 can then issue instructions for subsequent tasks.

In the example of FIG. 2, the instruction streaming engine 150 is configured to synchronize a prior instruction with a DMA instruction/task via an inst-sync instruction between the prior instruction and DMA instruction, wherein the inst-sync instruction synchronizes transferring of data from the memory 120 to the OCMs 210 in the processing tiles with the tasks being performed in the processing tiles. Here, the DMA instruction is either no-sync or inst-sync. Accordingly, the instruction streaming engine 150 is configured to assign the DMA instruction either the same color as the prior task if the DMA instruction is no-sync or different/new color from prior task if the DMA instruction is inst-sync. In some embodiments, a dma-in-progress message is sent to all processing tiles receiving the data per the DMA instruction, wherein the dma-in-progress instruction carries the color from the DMA instruction and is stored in the task queue of each processing tile. The dma-in-progress message serves to demarcate the order of the DMA instruction with respect to other POD and PE instructions in the task queue of each processing tile. In some embodiments, the instruction streaming engine 150 assigns a 4-bit ID to the DMA task that is sent to a data streaming engine 140, wherein the most significant bit (MSB) of the ID identifies the data streaming engine 140. In some embodiments, the data streaming engine 140 sends a DMA-done message to all processing tiles receiving the DMA data after the last piece of the DMA data is sent. Since the DMA-done message is sent on the same data mesh that carries the DMA data, the DMA-done message is in the same order as the DMA data. In some embodiments, the data streaming engine 140 also sends the DMA-done message to the instruction streaming engine 150 on a separate channel so that the instruction streaming engine 150 knows when the DMA is done and can re-cycle the ID. When a processing tile receives the DMA-done message, it matches the ID from the message with the ID of the dma-in-progress messages in the task queue in the oldest first manner so that the matching is considered done if the oldest ID is matched. The dma-in-progress that is at the head of the task queue is then tagged as done and removed from the task queue. Once removed, any subsequent tile tasks that have been synchronized with the DMA task are free to execute.

In some embodiments, each data streaming engine 140 is configured to issue both read and write requests to any processing tile to read data from or write data to the processing tile. Each processing tile, on the other hand, can issue read or write request to other processing tiles. In some embodiments, write requests can be multicast requests; e.g., they write the same data to the same location in multiple OCMs 210 in different processing tiles. All requests and responses between any source-destination pair of processing tiles and/or routers need to be in order. Since each processing tile is configured to perform operations on a portion of data maintained in its OCM 210, it is often necessary to pass data among the OCMs in different processing tiles via the routers 240 during a ML operation, e.g., an operation on a matrix by the array of processing tiles in the inference engine 160 wherein data of the matrix is divided and distributed among the OCMs 210 of the processing tiles. In some cases, the operation performed by processing tile may need data from another processing tile and have to wait for the operation by the other processing tile to complete.

In some embodiments, the inference engine 160 is configured to synchronize data communication among the OCMs 210 when data needs to be transmitted from one processing tile to another during a ML operation based on a color scheme, wherein every processing tile in the inference engine 160 is marked/colored either blue or red. Here, the color of a processing tile indicates the color of the task the processing tile is ready to execute or is currently executing. Each processing tile is configured to communicate its color to other processing tiles connected to it either directly or indirectly. In some embodiments, the processing tiles marked as blue have to wait until the processing tiles marked as red to finish their tasks/operations before the processing tiles marked as blue can proceed with their tasks/operations.

Figure 3:
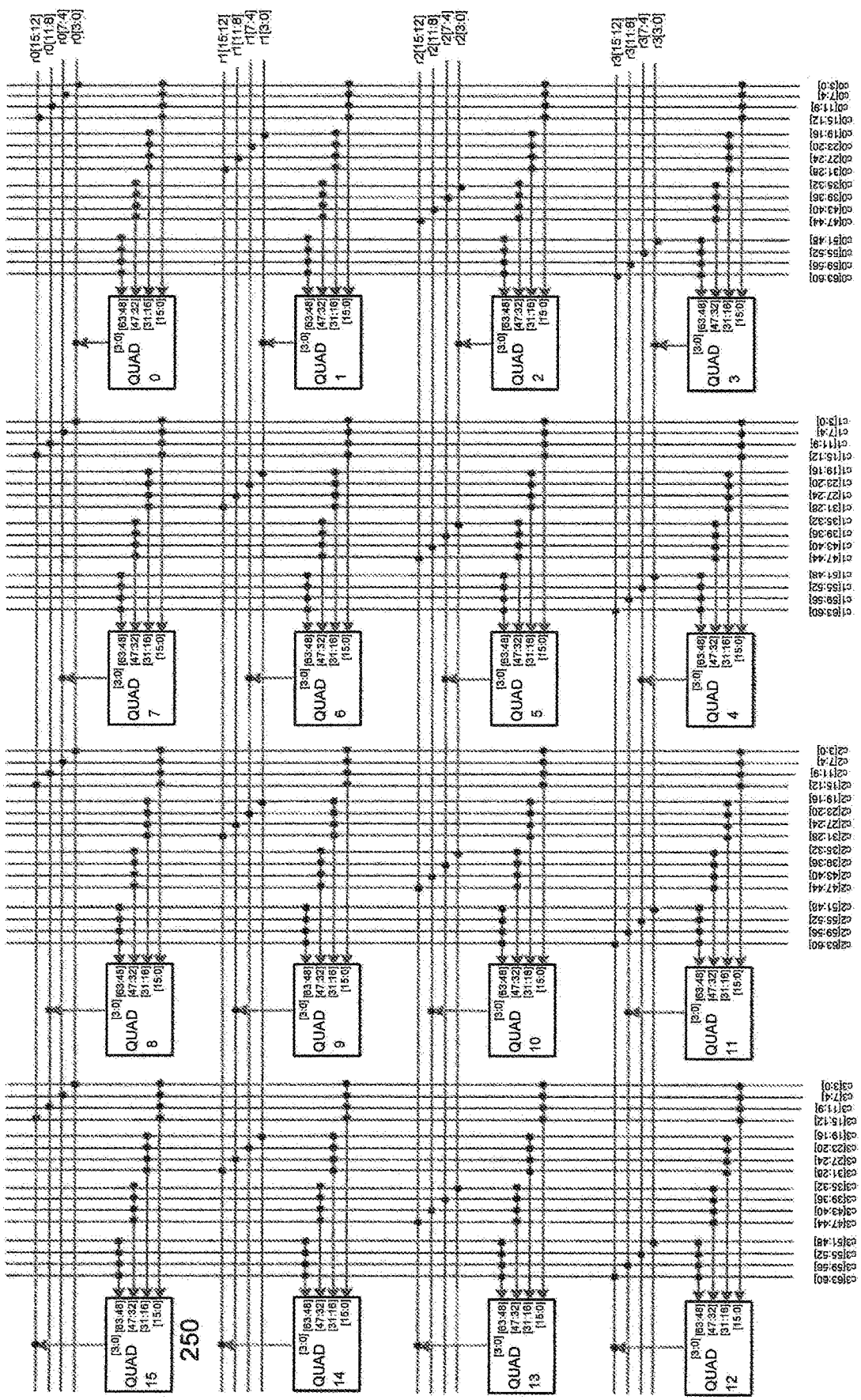
FIG. 3 depicts an example of illustrating logical connectivity of color bus between the processing tiles in the quads of the mesh of the inference engine according to one aspect of the present embodiments.

In some embodiments, the inference engine 160 is configured to utilize a color bus that carries color information from each tile to every other processing tile in the inference engine 160, In some embodiments, the color bus is a 64-bit logical bus, 1 bit per processing tile, with no contention or arbitration for the logical signals on the bus. Each processing tile is configured to drive one wire on the color bus carrying its color and there is a fixed latency between any two points (processing tile to processing tile and/or to a router). FIG. 3 depicts an example of illustrating logical connectivity of color bus between the processing tiles in the quads 250 of the mesh 260 of the inference engine 160. In some embodiments, the mesh 260 also includes a separate channel configured to communicate a message from the designated processing tile to the instruction streaming engine 150.

During its operation, each processing tile may switch its color from red to blue or from blue to red depending on the color of the task/operation it performs. Specifically, when a processing tile completes a task (via its POD 220 or PE 230), processing tile switches to the color of the next task/instruction in its instruction queue to be executed. In some embodiments, each processing tile needs to maintain a tile-level task queue, which keeps an order of incoming tasks for both POD 220 and PE 230 in the same processing tile to ensure correct color switching. In some embodiments, the tile-level task queue also stores for each task being processed by the processing tile one or more of sync bits (e.g., no-sync, local-sync, global-sync), the color, and the tile mask that specifies which other tiles are working on this task. Once the POD 220 or PE 230 complete its current task, they provide a done/complete signal to tile-level task queue, wherein the done signal triggers deallocating of the current task from the task queue and switching to the next task in the task queue. For a new task at the head of the tile-level task queue, it can be executed as soon as its required resources are available on the processing tile if no synchronization is needed for task (e.g., the task is marked as no_sync). Note that the color of the new task should be same as the color of the prior task since the instruction streaming engine 150 does not switch the color for tasks that do not require synchronization. If the task is marked for local synchronization (e.g., local_sync), then the task waits until the previous task running on the POD 220 or PE 230 in the processing tile to complete. When the previous task is done, the new task starts to be executed on the processing tile. Like in the case where no synchronization is required, the color of the new task should be same as the color of the prior task since the instruction streaming engine 150 did not switch the color for tasks that only require local synchronization. If the task requires global synchronization (e.g., global_sync) among different processing tiles, the task first waits until the previous task running on the POD 220 or PE 230 in the processing tile to complete. When the prior task is done, the processing tile drives the color of the new task, which has a different color than the prior task, on the color bus, indicating to all other processing tiles that this processing tile is ready to switch to the new task. The new task then waits until all bits on the color bus matching the tile mask have switched to the same color. When that happens, the color of the processing tile is internally switched to the new color and the new task starts to be executed on the processing tile. If the processing tile is one that is designated by the instruction streaming engine 150, the designated processing tile is configured to send a message to the instruction streaming engine 150 through dedicated wires on the mesh 260 to indicate that the synchronization is done.

In some embodiments, the instruction streaming engine 150 is configured to synchronize data communication between the core 130 and the inference engine 160, ensuring that data being transmitted between the core 130 and the inference engine 160 correctly reaches the corresponding processing tiles that perform tasks/operations on the data. Such synchronization eliminates the need for cache-coherence which may arise when data is shared and distributed among the core 130 and the OCMs 210, processing units such as PODs 220 and PEs 230 in the processing tiles of the inference engine 160.

In some embodiments, the instruction streaming engine 150 is configured to assign a core synchronization bit, e.g., a core_sync bit, in the inst-sync instruction discussed above to allow for synchronization between the core 130 with the processing tiles of the inference engine 160, e.g., to let the core 130 to wait for the processing tiles of the inference engine 160 to finish their current tasks. In some embodiments, the instruction streaming engine 150 has a register bit, sync_done, indicating that the synchronization is complete. This register bit is cleared when the instruction streaming engine 150 receives an inst-sync instruction with the core_sync bit set to 1, indicating that synchronization between the core and the inference engine 160 is needed. The sync_done bit is set to 1 when the core_sync bit of the inst-sync instruction is set to 1, indicating that the synchronization between the core and the inference engine 160 is completed. In some embodiments, the core 130 is configured to poll the core_sync bit in the inst-sync instruction and wait for the core_sync bit to transition from 0 to 1 to synchronize the core 130 with the processing tiles of the inference engine 160 before proceeding further with new instructions. The core 130 is expected to have only one outstanding inst-sync instruction with core_sync bit set to 1.

In the example of FIG. 1, data communication between the core 130 and the inference engine 160 happens through the DDR memory 120. Specifically, the core 130 is configured to write data to the DDR memory 120 and the inference engine 160 is configured to read the data from the DDR memory 120 via the data streaming engine 140 as discussed above. In some embodiments, a portion of the data written by the core 130 to the DDR memory 120 can be stored in the cache 132, e.g., L2 cache of the core 130. To ensure that the data is saved into the DDR memory 120 before the inference engine 160 reads from the DDR memory 120, the core 130 is configured to flush the data out of the cache 132 and into the DDR memory 120 first. In some embodiments, the core 130 flushes the portion of data from the cache 132 to the DDR memory 120 via, for a non-limiting example, an ML library function. The instruction streaming engine 150 is configured to wait for the flush from the cache 132 to the DDR memory 120 to complete before sending instructions to the processing tiles of the inference engine 160 to read data from DDR memory 120 via the data streaming engine 140.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A system to support a machine learning (ML) operation, comprising:
an inference engine comprising one or more processing tiles configured to receive data and to perform one or more computation tasks of the ML operation on the data based on a set of instructions; and
an instruction streaming engine configured to
distribute the set of instructions to the corresponding processing tiles of the inference engine, wherein each instruction of the set of instruction is associated with an indication and wherein instructions with a same indication are distributed to a subset of the plurality of processing tiles via a tile mask; and
synchronize data communication to the inference engine for coherence of the data shared and distributed between a core and the inference engine.

2. The system of claim 1, wherein:
the data is received from a double data rate (DDR) memory.

3. The system of claim 1, wherein:
each of the processing tiles comprises at least one or more of
an on-chip memory (OCM) configured to load and maintain the data for local access by components in the processing tile;
one or more processing units configured to perform the one or more computation tasks of the ML operation on the data in the OCM by executing the set of instructions.

4. The system of claim 3, wherein:
each of the processing units in each processing tile includes one or more of
a first processing unit configured to perform a dense and/or regular computation task of the ML operation on the data in the OCM; and
a second processing unit configured to perform a sparse and/or irregular computation task of the ML operation on the data in the OCM and/or from the first processing unit.

5. The system of claim 1, wherein:
the core is configured to process a plurality of performance non-critical tasks of the ML operation on the data.

6. The system of claim 1, wherein:
the instruction streaming engine is configured to assign a core synchronization bit in a synchronization instruction, wherein the core wait for the processing tiles of the inference engine to finish their current tasks in response to the core synchronization bit.

7. The system of claim 6, wherein:
the core is configured to poll the core synchronization bit in the synchronization instruction and wait for the core synchronization bit to transition from one value to another value to synchronize the core with the processing tiles of the inference engine before proceeding further with new instructions.

8. The system of claim 1, further comprising:
a data streaming engine configured to stream data between a memory unit and the processing tiles of the inference engine.

9. The system of claim 8, wherein:
the core is configured to write the data for the ML operation to the memory unit; and
the inference engine is configured to read the data from the memory unit via the data streaming engine.

10. The system of claim 9, wherein:
the core further includes a cache, wherein a portion of the data written by the core to the memory unit is stored in the cache.

11. The system of claim 10, wherein:
the core is configured to flush the data out of the cache and into the memory unit first so that the data is saved into the memory unit before the inference engine reads from the memory unit.

12. The system of claim 11, wherein:
the instruction streaming engine is configured to wait for the flush from the cache to the memory unit to complete before sending instructions to the processing tiles of the inference engine to read data from the memory unit via the data streaming engine.

13. A method to support a machine learning (ML) operation, comprising:
distributing a set of instructions to one or more corresponding processing tiles of an inference engine, wherein each instruction of the set of instructions is associated with an indication and wherein instructions with a same indication are distributed to a subset of the processing tiles via a tile mask;
synchronizing data communication to the inference engine for coherence of a data shared and distributed to the inference engine; and
performing one or more computation tasks of the ML operation on the data via the corresponding processing tiles based on the set of task instructions.

14. The method of claim 13, further comprising:
processing by a core a plurality of performance non-critical tasks of the ML operation on the data.

15. The method of claim 13, further comprising:
assigning a core synchronization bit in a synchronization instruction, wherein a core wait for the processing tiles of the inference engine to finish their current tasks in response to the core synchronization bit.

16. The method of claim 15, further comprising:
polling the core synchronization bit in the synchronization instruction and wait for the core synchronization bit to transition from one value to another value to synchronize the core with the processing tiles of the inference engine before proceeding further with new instructions.

17. The method of claim 13, further comprising:
streaming data between a memory unit and the processing tiles of the inference engine via a data streaming engine.

18. The method of claim 17, further comprising:
writing the data for the ML operation to the memory unit; and
reading the data from the memory unit via the data streaming engine.

19. The method of claim 18, further comprising:
storing a portion of the data written by the core to the memory unit in a cache of a core.

20. The method of claim 19, further comprising:
flushing the data out of the cache and into the memory unit first so that the data is saved into the memory unit before the inference engine reads from the memory unit.

21. The method of claim 20, further comprising:
waiting for the flush from the cache to the memory unit to complete before sending instructions to the processing tiles of the inference engine to read data from the memory unit via the data streaming engine.

22. A system to support a machine learning (ML) operation, comprising:
- a means for distributing a set of instructions to one or more corresponding processing tiles of an inference engine, wherein each instruction of the set of instructions is associated with an indication and wherein instructions with a same indication are distributed to a subset of the processing tiles via a tile mask;
- a means for synchronizing data communication to the inference engine for coherence of a data shared and distributed to the inference engine; and
- a means for performing one or more computation tasks of the ML operation on the data via the corresponding processing tiles based on the set of task instructions.

23. The system of claim 22, further comprising:
a means for processing a plurality of performance non-critical tasks of the ML operation on the data.

24. The system of claim 22, further comprising:
a means for assigning a core synchronization bit in a synchronization instruction, wherein a core wait for the processing tiles of the inference engine to finish their current tasks in response to the core synchronization bit.

25. The system of claim 24, further comprising:
a means for polling the core synchronization bit in the synchronization instruction and wait for the core synchronization bit to transition from one value to another value to synchronize the core with the processing tiles of the inference engine before proceeding further with new instructions.

26. The system of claim 22, further comprising:
a means for streaming data between a memory unit and the processing tiles of the inference engine via a data streaming engine.

27. The system of claim 26, further comprising:
- a means for writing the data for the ML operation to the memory unit; and
- a means for reading the data from the memory unit via the data streaming engine.

28. The system of claim 27, further comprising:
a means for storing a portion of the data written by the core to the memory unit in a cache of a core.

29. The system of claim 28, further comprising:
a means for flushing the data out of the cache and into the memory unit first so that the data is saved into the memory unit before the inference engine reads from the memory unit.

30. The system of claim 29, further comprising:
a means for waiting for the flush from the cache to the memory unit to complete before sending instructions to the processing tiles of the inference engine to read data from the memory unit via the data streaming engine.

* * * * *